3,194,759
LUBRICATED BEARING ASSEMBLY
Martin J. Devine, 2560 Prescott Road, Havertown, Pa.,
and Edward R. Lamson, Greentree Road, Sewell, N.J.
No Drawing. Filed Oct. 31, 1962, Ser. No. 234,912
1 Claim. (Cl. 252—12)
(Granted under Title 35, U.S. Code (1952), sec. 266)

The invention described herein may be manufactured and used by or for the Government for governmental purposes without the payment of any royalties thereon.

The present invention relates to a lubricating system for providing lubrication between sliding or rolling surfaces engaged in frictional contact, of grease or oil lubricated bearings and more particularly to a system wherein the bearing surface of at least one of the sliding or rolling surfaces is composed of molybdenum and the grease or oil in contact therewith contains a sulphur additive.

The usual means of providing lubrication for bearings consists of applying an oil or grease to those surfaces of the bearing which are in frictional contact. Metals such as aluminum and copper and metallic alloys such as steel have been used to make bearings with the only consideration in the selection of the particular component being given to the relative strength and hardness of the metal or alloy employed. Frequently, one part of the bearing is made from one alloy and another part from a different alloy. The chief disadvantage with the bearings made of steel, copper, aluminum, and the like is their relatively limited wear life and load carrying capacity.

Therefore, it is an object of the present invention to provide a bearing-lubricant system which will greatly enhance both the wear life and load carrying capacity of the bearing.

Another object of the present invention is to provide a novel lubricating system that is easily and inexpensively adaptable to existing bearings.

Other objects and the advantages of the invention will be apparent from the following description taken in connection with the appended claim.

It is known that molybdenum disulphide provides an excellent lubricating agent and that it could be formed by continuously applying a sulphur compound to the surface of molybdenum when subjected to elevated temperatures above 600° C.

The patent of Mitchell (No. 2,697,645) teaches a method of forming molybdenum disulphide at the surface of a bearing component part, where at least a substantial preparation of the bearing surface of said component part is composed of molybdenum, by passing hydrogen sulphide over the molybdenum surface at a temperature of 600° C. However, the application of Mitchell's solution to high temperature bearing lubrication problems as a solution to the problems of those bearings employing oils and greases as lubricants would be impractical because of the temperature limitations on the part of oils and greases.

We are not sure that in the subject invention there is an actual formation of molybdenum disulphide at the bearing surface. The sulphur additive in the lubricant may provide only a temporary exchange between the sulphur and the molybdenum at the surface of the bearing rather than an actual formation of molybdenum disulphite. In theory, we feel that the high affinity of molybdenum for lubrication with oils or greases containing even very small amounts of sulphur compounds indicates that some type of a reaction probably takes place between the lubricant and the molybdenum metal. Stated in another manner, the molybdenum enters into the lubrication directly rather than remaining relatively passive as in the case of steel and other non-molybdenum alloys.

The following examples were tested on a Falex Wear Test Apparatus. The apparatus consists of two V-blocks and a cylindrical pin. In our procedure, the pin was made either of molybdenum or of steel. A particular grease containing a sulphur additive was placed on the V-blocks and the pin was rotated. Wear tests were conducted at a gauge load of 1,000 lbs.

The following examples demonstrate the exceptional gain in wear life achieved by the teaching of this invention.

*Example I*

| | V-block material | Oil base | Thickener | Sulphur additive | | Endurance life (min.) pin material | |
|---|---|---|---|---|---|---|---|
| | | | | Type | Percent | Steel | Molybdenum |
| 1 | AISI-1137 Steel | Petroleum | Silica | None | 0 | 18-21 | 320+ |
| 2 | do | do | do | MoS$_2$ | 5 | 85-67 | 240+ |
| 3 | do | do | do | Diamyl sulphide | 5 | 54-62 | 480+ |
| 4 | do | do | do | Dibenzyl disulphide | 5 | 63-76 | 300+ |
| 5 | do | do | do | 2-mercaptobenzothiazole | 5 | 169-122 | 485+ |
| 6 | do | do | do | Tri-p-tolyl thiophosphate | 5 | 255-298 | 480+ |
| 7 | do | do | do | Dibenzyl disulphide | 1 | 161-165 | 480+ |
| 8 | do | do | do | 2-mercaptobenzothiazole | 1 | 112-131 | 480+ |
| 9 | do | do | do | do | 10 | 115-151 | 480+ |
| 10 | do | do | do | Antimony diamyl dithiocarbamate | 1 | 52-53 | 480+ |
| 11 | do | do | do | do | 5 | 212-165 | 480+ |
| 12 | do | do | do | do | 10 | 155-178 | 480+ |
| 13 | do | do | do | Barium diamyl phenolate sulphide | 1 | 269-280 | 430+ |
| 14 | do | do | do | do | 5 | 100-125 | 482+ |

We have discovered that if a sulphur compound is added to a grease or oil lubricant and if this lubricant is used to lubricate a bearing wherein one or more of the sliding or rolling component parts of the bearing being lubricated contains molybdenum metal or a molybdenum alloy, a substantial improvement in the performance of the bearing is observed.

It will be noted that in all cases there was no failure observed in the molybdenum pin. The fact that the molybdenum pin lasted for 320 minutes without failure and with no sulphur added is explained in that all petroleum based greases contain some sulphur as an impurity; however, the sulphur impurity does not function advantageously in the same manner as the invention described since under high load conditions the following results were obtained:

| Oil | Thickener | Sulphur additive | | Endurance life, months |
|---|---|---|---|---|
| | | Type | Percent | |
| Petroleum | Silica | 0 | 0 | 8 |
| Do | do | MoS$_2$ | 5 | 30+ |

*Example II*

| | V-block material | Thickener type | Oil base | Sulphur additive | | Steel | Molybdenum |
|---|---|---|---|---|---|---|---|
| | | | | Type | Percent | | |
| 1 | AISI-1137 Steel | Calcium soap | Petroleum | None | None | 14-26 | 141 |
| 2 | do | do | do | MoS$_2$ | 5 | 45-63 | 252 |

It will be noted that with a molybdenum disulphide additive, there was a 300% increase in the performance of the molybdenum pin over the steel pin.

By observing and comparing the results in the above tables wherein various greases, depending on the oil base and the thickener employed, are shown to have an improved lubricating effect on molybdenum as compared to steel if they contain a sulphur additive. It is believed that for the first time, an improved lubricating effect can be achieved if a sulphur containing grease is employed in conjunction with a molybdenum containing bearing component.

For the purposes of the present invention, we shall hereinafter refer to the various greases and oils mentioned above and including those to which the invention is ap-

*Example III*

| | V-block material | Thickener type | Oil base | Sulphur additive | | Steel | Molybdenum |
|---|---|---|---|---|---|---|---|
| | | | | Type | Percent by weight | | |
| 1 | AISI-1137 Steel | Clay | Pentaerythritol ester | None | None | 120-137 | 300+ |
| 2 | do | do | do | MoS$_2$ | 5 | 120-144 | 480+ |

*Example IV*

| | V-block material | Thickener type | Oil base | Sulphur additive | | Steel | Molybdenum |
|---|---|---|---|---|---|---|---|
| | | | | Type | Percent by weight | | |
| 3 | AISI-1137 Steel | Lithium soap | Diester | None | 0 | 10-45 | 191 |
| 4 | do | do | do | MoS$_2$ | 5 | 38-40 | 390+ |
| 5 | do | do | do | Sulphur | 5 | 72-82 | 280+ |
| 6 | do | do | do | Dibenzyl disulphide | 1 | 38-44 | 420+ |
| 7 | do | do | Petroleum | None | 0 | 14-26 | 141 |
| 8 | do | do | Polyalkylene glycol | None | 0 | 1-1 | 180+ |
| 9 | do | do | do | MOS$_2$ | 5 | 10-19 | 240+ |

*Example V*

| | V-block material | Thickener type | Oil base | Sulphur additive | | Steel | Molybdenum |
|---|---|---|---|---|---|---|---|
| | | | | Type | Percent by weight | | |
| 10 | AISI-1137 Steel | Silica | Polyphenyl ether | None | 0 | 1 | 2 |
| 11 | do | do | do | MoS$_2$ | 5 | 1 | 36 |
| 12 | do | do | Silicate ester | None | 0 | 10-12 | 14 |
| 13 | do | do | do | MoS$_2$ | 5 | 22 | 22 |

*Example VI*

| | V-block material | Thickener type | Oil base | Sulphur additive | | Steel | Molybdenum |
|---|---|---|---|---|---|---|---|
| | | | | Type | Percent by weight | | |
| 1 | AISI-1137 Steel | Arylurea | Silicone | None | 0 | 0.5 | 6 |
| 2 | do | do | do | MoS$_2$ | 5 | 1.5 | 12 | plicable by the term "oily material," and additionally, we prefer to utilize the following as our lubricant:

petroleum lubricants,
a diester oily material,
a polyalkylene glycol oily material,
a silicate ester oily material,
a polyphenyl ether oily material,
a pentaerythritol ester oily material,
silicone oily materials, and mixtures of the same.

It will be understood that various changes in the details, materials, and arrangement of parts which have been herein described and illustrated in order to explain the nature of the invention, may be made by those skilled in the art within the principle and scope of the invention as expressed in the appended claim.

What is claimed is:

The method of greatly decreasing the wear of the bearing surfaces of two movable parts, one of said bearing surfaces being of one metal and the other of said bearing surfaces being of a different metal which is essentially molybdenum which comprises:

disposing between said surfaces a lubricant selected from the group of lubricants consisting of petroleum, diester, polyalkylene glycol, silicate ester, polyphenyl ether, pentaerythritol ester, and silicone, said lubricant being characterized by the presence therein of at least one member of the group consisting of sulphur and sulphur compounds, and during operation of said bearing at temperatures within the temperature limitations of said group of lubricants producing a temporary exchange between said last named member and said surface essentially of molybdenum.

References Cited by the Examiner

UNITED STATES PATENTS

| | | | |
|---|---|---|---|
| 2,007,137 | 7/35 | Abrams | 252—24 |
| 2,629,691 | 2/53 | Peterson | 252—28 |
| 2,697,645 | 12/54 | Mitchel | 308—241 |
| 2,710,839 | 6/55 | Swakon et al. | 252—51.5 |
| 2,764,547 | 9/56 | Fields | 252—24 |

OTHER REFERENCES

"Manufacture and Application of Lubricating Greases," by Boner, Reinhold Publishing Corporation, 1954, New York, pages 782–783.

DANIEL E. WYMAN, *Primary Examiner.*